US010784771B2

(12) United States Patent
Sreenivas

(10) Patent No.: US 10,784,771 B2
(45) Date of Patent: Sep. 22, 2020

(54) MULTIPHASE POWER SUPPLY AND DISTRIBUTED PHASE CONTROL

(71) Applicant: Infineon Technologies Austria AG, Villach (AT)

(72) Inventor: Venkat Sreenivas, Winchester, MA (US)

(73) Assignee: Infineon Technologies Austria AG, Villach (AT)

( * ) Notice: Subject to any disclaimer, the term of this patent is extended or adjusted under 35 U.S.C. 154(b) by 382 days.

(21) Appl. No.: 15/344,845

(22) Filed: Nov. 7, 2016

(65) Prior Publication Data
US 2018/0131263 A1    May 10, 2018

(51) Int. Cl.
*H02M 1/084* (2006.01)
*H02M 3/158* (2006.01)
*H02M 1/15* (2006.01)
*H02M 1/00* (2006.01)

(52) U.S. Cl.
CPC ............. *H02M 1/084* (2013.01); *H02M 1/15* (2013.01); *H02M 3/1584* (2013.01); *H02M 1/0845* (2013.01); *H02M 2001/0012* (2013.01)

(58) Field of Classification Search
CPC ...... H02M 1/08; H02M 1/084; H02M 1/0845; H02M 3/00; H02M 3/02; H02M 3/04; H02M 3/10; H02M 3/145; H02M 3/155; H02M 3/156; H02M 3/1563; H02M 3/1566; H02M 3/157; H02M 3/1588; H02M 3/158; H02M 3/1584; H02M 2003/1586; H02M 2001/008; H02M 2001/0067; H02M 1/15; H02M 2001/0012; H02M 2003/1566; H03H 11/16; H03H 11/18; H03H 11/20; H03H 11/22; G05F 1/455
USPC ........ 323/205–219, 222–226, 237, 241, 268, 323/269, 271–275, 280, 282–285, 351, 323/910; 363/36, 65, 123, 124; 713/300–340
See application file for complete search history.

(56) References Cited

U.S. PATENT DOCUMENTS

| | | | |
|---|---|---|---|
| 2009/0198460 A1* | 8/2009 | Carroll | G01R 19/2513 702/60 |
| 2015/0207400 A1* | 7/2015 | Shenoy | H02M 3/1584 323/213 |
| 2017/0060154 A1* | 3/2017 | Ozawa | G05F 1/575 |

* cited by examiner

Primary Examiner — Thienvu V Tran
Assistant Examiner — Carlos O Rivera-Perez
(74) Attorney, Agent, or Firm — Armis IP Law, LLC

(57) ABSTRACT

A power converter circuit includes multiple phases and controller circuitry. The multiple phases collectively operate to produce an output voltage to power a load. The controller circuitry monitors an output voltage and produces control information to control the multiple phases. Controller circuitry in each respective phase of the multiple phases processes the control information independently with respect to other phases to determine whether to output a quantum of energy to maintain regulation of the output voltage. In one arrangement, the control information provides general information indicating, such as for each control cycle, how much current is needed to supply to a load to maintain the output voltage. In a specific arrangement, identities of the phases are randomized over each of multiple cycles so that randomly chosen, but an appropriate number of phases is activated to supply current to the load.

33 Claims, 12 Drawing Sheets

MULTIPHASE POWER SUPPLY AND DISTRIBUTED PHASE CONTROL

BACKGROUND

Conventional multi-phase voltage regulators are typically configured to precisely control timing and order of activating multiple phases to produce an output voltage to power a respective load. For example, in a conventional multi-phase power supply, phases are selected for activation. Thereafter, a conventional controller controls the phases such that the current supplied by each of multiple phases is typically spread out over time to reduce a magnitude of ripple voltage in the output voltage.

In accordance with conventional techniques, to provide precise control of the output voltage, as well as low ripple, a conventional power supply requires complex circuitry to control the phases.

BRIEF DESCRIPTION

This disclosure includes the observation that conventional techniques of controlling phases in a multiphase power supply suffer from deficiencies. For example, as previously discussed, conventional power supplies require complex timing and control circuitry to provide reliable power with low ripple voltage. As an example, as phase count grows (i.e., more phases are implemented in a power supply), a respective control circuit that oversees the phase current balancing must decide which phases to start/stop as well as a respective phase order. Controlling precise timing of a large number of phases can be difficult.

Embodiments herein include novel ways of controlling multiple phases in a power supply to produce an output voltage.

More specifically, embodiments herein include a multi-phase power supply circuit. The multi-phase power supply circuit includes multiple phases such as a first phase, second phase, third phase, etc., that collectively (via sinking and sourcing of energy such as current) produce an output voltage to power a dynamic load. According to embodiments herein, the multi-phase power supply circuit can be configured to include a controller circuitry ((e.g., PID controller) operable to monitor a output voltage (any attribute such as magnitude, slope, integral, etc.) and produce control information indicating how to control the multiple phases; the controller circuitry generates the control information based on the monitored output voltage. In one embodiment, each respective phase of the multiple phases processes the control information independently with respect to other phases to determine whether to output a predetermined quantum of energy, charge, current, etc., for a given control cycle to maintain regulation of the output voltage. Thus, instead of the controller precisely controlling each of the multiple phases, the phases can be configured to make decisions about control based on using control information generated by a controller that monitors the output voltage and determines how much energy needs to be sourced or sinked.

In accordance with further embodiments, instances of the control information produced by the controller circuitry provide general information to phases indicating, for each control cycle, how much current (or amount of energy) to supply to a load to help maintain the output voltage within regulation for a given cycle. In a specific embodiment, identities of the phases are randomized over each of multiple cycles so that an appropriate number of phases is activated for a given cycle, but selection of whether to activate a phase is randomized. In such an instance, for a given control cycle, a controller (generating the control information) does not specifically select which of the phases to activate but instead relies on the phases themselves (and a randomization technique implemented by the phases) to determine which phases are to be activated in accordance with the control information.

In accordance with further embodiments, note that the control information generated by controller circuitry can include one or more control parameters. For example, the control information generated by respective control circuitry can include a first control parameter (such as a polarity value) specifying a polarity of the response (whether to source or sink energy).

The setting of the polarity value indicates to the phases whether the phases should collectively sink or source current to maintain the output voltage within a desired range. In accordance with the control information, a respective phase sources current to the load in furtherance of increasing the output voltage; a respective phase sinks current from the load (and output capacitance) in furtherance of decreasing the output voltage.

In accordance with yet further embodiments, note that the control information can include a second control parameter (such as a probability value). In one embodiment, the magnitude of the probability value varies depending on a monitored parameter such as the error voltage. For example, the magnitude of the second control parameter (probability value between 0 and 1) can indicate a relative percentage of phases that should be activated within a corresponding control cycle to reduce the error voltage (and maintain the output voltage within a desired range).

In accordance with still further embodiments, the multi-phase power supply circuit further optionally includes a randomizer resource such as a random number generator. The random number generator is operable to produce a respective random number for each control cycle of multiple control cycles. In one embodiment, each of the phases uses the respective random number generated for the given cycle to produce a unique personal random number. More specifically, in one embodiment, each phase of the multiple phases is assigned a corresponding static unique identifier value. Based on input (such as random number data) from the randomizer resource, each respective phase of the multiple phases applies the respective random number data to its corresponding static unique identifier value to produce a respective unique personal random number for the respective phase for the given control cycle. As further described herein, the respective phase uses its respective personal random number (which is potentially normalized between 0.0 and 1.0) and the control information (such as the probability value) to determine whether to activate the phase during the control cycle.

In yet further embodiments, the amount of response (such as an approximate number of phases to activate) for a given control cycle is predetermined (by a central controller) as indicated by a setting of the second control parameter (probability value), but the selection of the phases to be activated in the given control cycle is randomized (as discussed above) in accordance with the personal random number (normalized) values assigned to the multiple phases over multiple control cycles. For a given control cycle, the polarity value produced by the controller indicates whether the randomized phases for the given control cycle are to source or sink current.

In one non-limiting example embodiment, controller circuitry monitors the output voltage (one or more attribute such as magnitude, slope, integral, etc.). In one embodiment, the controller need not react to only the magnitude of the output voltage. For example, even though the output voltage may be higher than the reference voltage, the controller circuitry can be configured to choose to send current/charge to the output if the controller circuitry detects that the output voltage, while high, is diving steeply. Or the controller circuitry may not output current even though the output voltage is lower than the reference voltage if it is detected that the output voltage is climbing fast.

In accordance with further embodiments, note that each of the phases can be configured to keep track of a degree to which a respective phase was used on one or more recent control cycles. In one embodiment, each phase can be configured to generate a stamina value. In such an instance, to prevent overuse of any given phase, after activation of a phase, it might take a few clock cycles for the respective phase to be eligible again to deliver a packet of energy on a subsequent control cycle. In such an instance, in accordance with the stamina factor, assuming that a given phase recently delivered a quantum of energy on one or more prior (such as most recent) control cycles, using the stamina value, there is a lower probability that the given phase will be selected to generate a new packet is lower immediately after delivering a packet until it becomes available again after an amount of non-use. Thus, if desired, a recently overused phase can be temporarily placed on an ineligible list until the phase is unused for an appropriate number of subsequent control cycles.

Embodiments herein provide advantages over conventional techniques. For example, independent decision-making by each of the phases (such as whether to activate itself for a given control cycle) reduces the need for highly complex circuitry to control the phases. More specifically, instead of requiring complex control circuitry to orchestrate activation of the phases in accordance with precise timing, embodiments herein provide a degree of random selection and subsequent controlled activation of a number of phases in a multi-phase power supply (for each control cycle) to maintain an output voltage within a desired range. In one embodiment, the number of phases is predetermined.

When the number of phases in the multi-phase power supply circuitry is sufficiently high in number (such as based on a power of 2), embodiments herein provide redundancy and therefore fault-tolerance. That is, if a single phase fails out of many phases, the super majority of other non-failing phases continue to receive the control information and maintain the output voltage within a desired range. Moreover, control of multiple phases in this manner is highly responsive, especially when the number of phases is greater than a number such as 16, 32, 64, 128, etc.

These and other more specific embodiments are disclosed in more detail below.

Note that although embodiments as discussed herein are applicable to multi-phase power supply circuits such as those implementing DC-DC converter phases, the concepts disclosed herein may be advantageously applied to any other suitable topologies as well as general power supply control applications.

Note further that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply. For example, in one embodiment, the instructions, when carried out by a computer processor hardware, cause the computer processor hardware to: monitor a output voltage; produce control information that randomizes activation of the multiple phases over each of multiple control cycles, the control information generated based on the monitored output voltage; and in accordance with the control information, in each respective phase of the multiple phases, process the control information independently with respect to other phases to determine whether to output a predetermined quantum of energy to maintain regulation of the output voltage.

Another particular embodiment of the present disclosure is directed to a computer program product that includes a computer readable medium having instructions stored thereon for supporting operations such as controlling phases in a power supply. For example, in one embodiment, the instructions, when carried out by a computer processor hardware, cause the computer processor hardware to: monitor a output voltage; produce control information that randomizes activation of the multiple phases over each of multiple control cycles, the control information generated based on the monitored output voltage; and in accordance with the control information, selectively output a quantum of energy from each respective phase of the multiple phases to maintain regulation of the output voltage in accordance with the control information.

The ordering of the steps has been added for clarity sake. These steps can be performed in any suitable order.

It is to be understood that the system, method, device, apparatus, etc., as discussed herein can be embodied strictly as hardware, as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein include a multi-phase power supply circuit including multiple phases and controller circuitry. The multiple phases collectively operate to produce an output voltage to power a load. The controller circuitry (such as at a central location) is operable to monitor an output voltage and produce control information to control the multiple phases. Each respective phase of the multiple phases is operable to receive and then process the control information independently with respect to other phases to determine whether to output a predetermined quantum of energy to maintain regulation of the output voltage for a respective control cycle. For each of multiple control cycles, the control information provides general information indicating, such as for a given control cycle of multiple control cycles, how much current is needed to supply (sink or source) to a load to maintain the output voltage within regulation for that control cycle. In accordance with one embodiment, in furtherance of independent processing by each of the phases, identities of the phases are randomized over each of multiple cycles so that a randomly chosen number of phases is activated to supply current to the load.

Figure 1:
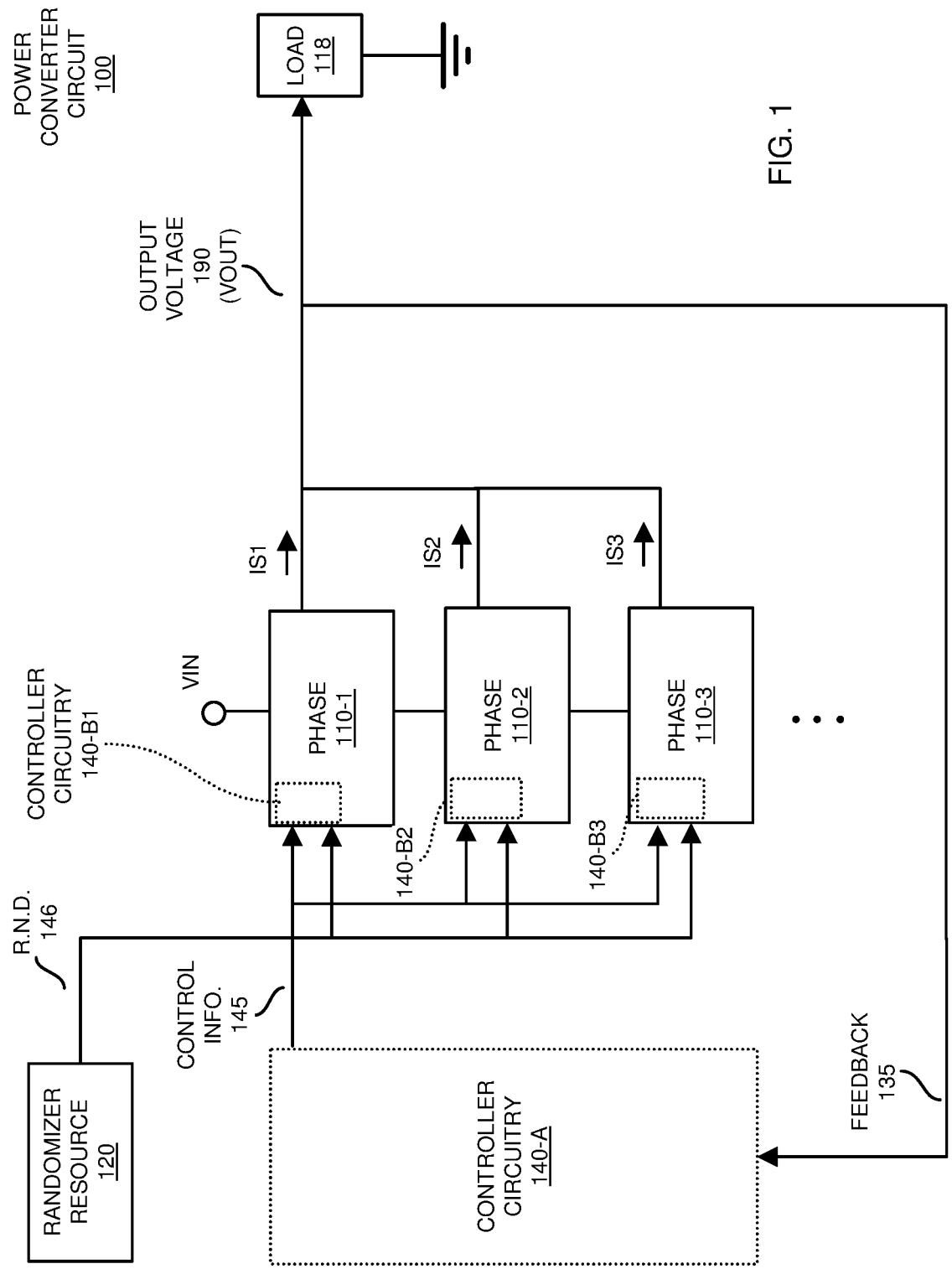
FIG. 1 is an example general diagram of a power converter circuit including multiple phases and respective central and distributed control circuitry according to embodiments herein.

Now, more specifically, FIG. 1 is an example diagram of a power converter circuit and respective circuitry according to embodiments herein.

As shown, power converter circuit 100 includes multiple phases 110 (such as phase 110-1, phase 110-2, phase 110-3, etc.), and randomizer resource 120. Additionally, power converter circuit 100 includes controller circuitry 140-A, controller circuitry 140-B1 associated with phase 110-1, controller circuitry 140-B2 associated with phase 110-2, controller circuitry 140-B3 associated with phase 110-3, etc., (collectively, referred to as controller circuitry 140).

Each of the multiple phases 110 can be any suitable type of resource that sinks or sources current to produce output voltage 190 to power load 118.

In one embodiment, each of the phases 110 receives input voltage (Vin) such as a DC (Direct Current) voltage. The phases 110 collectively produce output voltage 190 (Vout such as a DC voltage). Thus, the power converter circuit 100 can be a DC to DC power converter or other suitable resource capable of sourcing for sinking current.

In one embodiment, the controller circuitry 140-A is operable to produce control information 145. Control circuitry 140-A supplies the control information 145 to each of the phases 110. Each of the phases 110 uses the control information 145 to determine whether or not the respective phase should be activated to power the load 118.

More specifically, during operation, the multiple phases 110 collectively (via sinking and sourcing of current) produce an output voltage 190 to power dynamic load 118. The multi-phase power supply circuit includes controller circuitry 140-A operable to monitor a output voltage 190 and produce control information 145 to control the multiple phases 110; the controller circuitry 140-A generates the control information 145 based on the monitored output voltage 190.

In one embodiment, as further shown and discussed herein, each respective phase of the multiple phases 110 processes the control information 145 independently with respect to other phases to determine whether to output a quantum of energy (such as an amount of current, amount of charge, etc.) to maintain regulation of the output voltage 190 within a desired range with respect to a reference voltage.

In accordance with a further embodiment, instances of the control information 145 produced by the controller circuitry 140-A provide general information to phases 110 indicating, for each control cycle of multiple control cycles, how much current (quantum of energy or other predetermined value) to supply to the output capacitor 125 and load 118 to maintain the output voltage 190 within regulation.

In one embodiment, the power converter circuit 100 includes a randomizer resource 120 as shown. The randomizer resource 120 (such as a random number generator) provides random number data 146 (such as a unique random number) to each of the phases 110 for each cycle multiple control cycles.

As further described herein, each of the phases 110 uses the random number data 146 to randomize activation of the respective phases. For example, identities of the phases are randomized over each of multiple cycles so that an appropriate number of phases are activated for a given cycle, but selection of whether to activate a phase is randomized. Thus, for a given control cycle, a controller (generating the control information) does not specifically select which of the phases to activate but instead relies on the phases themselves (and a randomization technique) to determine which phases are to be activated in accordance with the control information.

Accordingly, embodiments herein include a multi-phase power supply circuit comprising multiple phases 110 as well as control circuitry 140. The multiple phases 110 collectively operate to produce output voltage 190 to power load 118. The controller circuitry 140-A monitors a output voltage 190 (from feedback 135) and produces control information 145. The random number data 146 randomizes activation of the multiple phases 110 over each of multiple control cycles. In accordance with the received control information 145 and the random number data 146 for a given control cycle, each respective phase of the multiple phases determines whether to output a quantum of energy to maintain regulation of the output voltage in accordance with the control information for the given control cycle. Randomizing the identities associated with each of the phases 110 ensures that no given phase is overworked supplying or sinking current, charge, etc., from the output capacitor 125.

In accordance with further embodiments, note that the control information 145 can include a first control parameter (such as a polarity value) specifying a polarity of an error voltage, which is derived from comparing a magnitude of the output voltage to a reference voltage (about which the output voltage is regulated).

In general, a setting of the polarity value indicates whether the output voltage is greater than or less than the reference voltage. Accordingly, the setting of the polarity value indicates to the phases whether the phases should collectively sink or source current load for the given control cycle to maintain the output voltage 190. In accordance with the control information 145, one or more respective phases 110 sources current to the load 118 in furtherance of increasing the output voltage 190; one or more respective phases 110 sinks current from the load 118 in furtherance of decreasing the magnitude of the output voltage 190.

In accordance with yet further embodiments, note that the control information 145 can include a second control parameter (such as a probability value), whose magnitude varies depending on a monitored parameter such as the error voltage associated with output voltage 190. As further described herein, in one embodiment, the magnitude of the second control parameter (probability value) is proportional to a relative number of phases 110 that should be activated to reduce the error voltage (and maintain the output voltage within a desired range).

Figure 2:
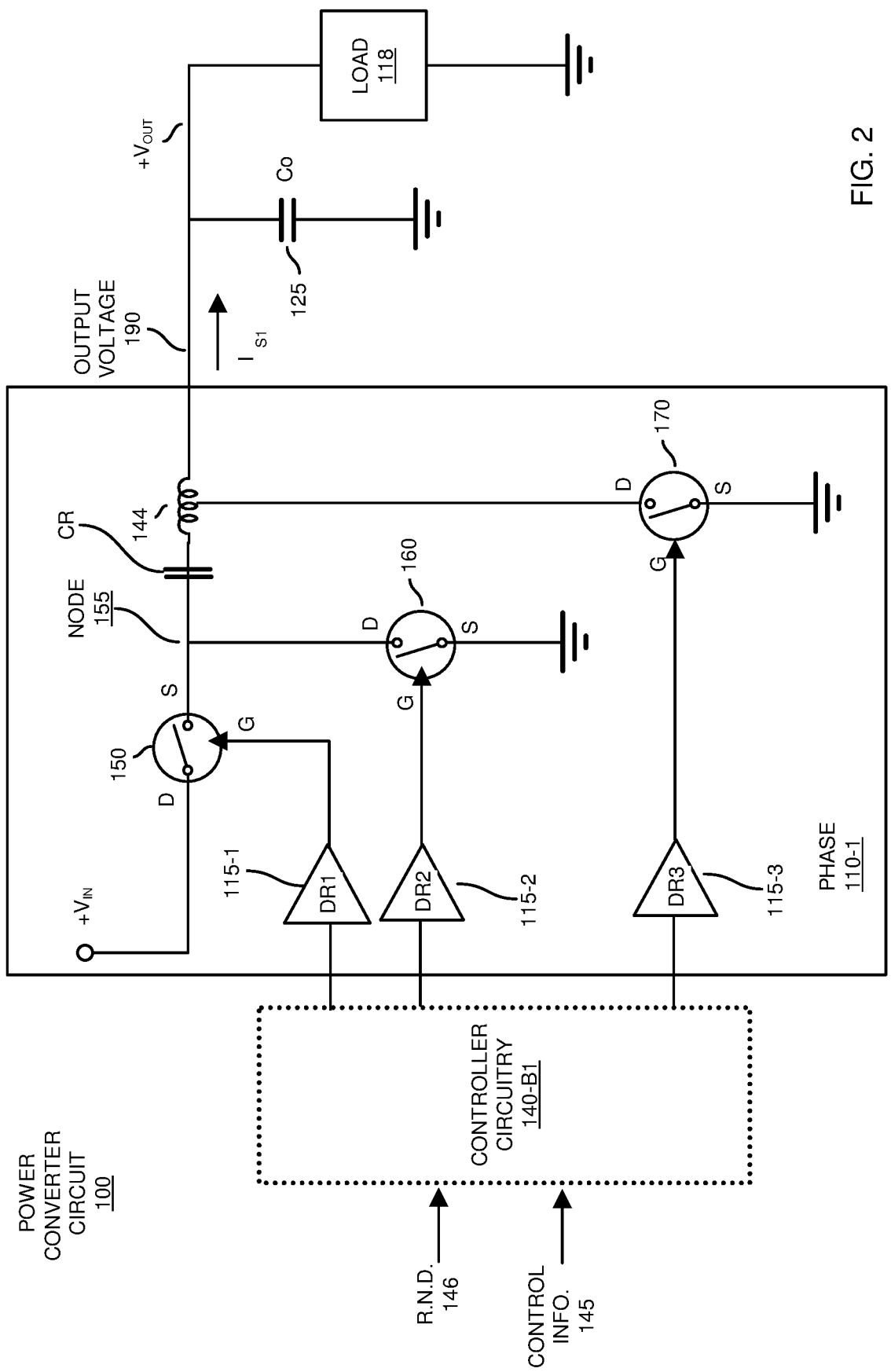
FIG. 2 is an example diagram illustrating details of an example phase according to embodiments herein.

FIG. 2 is an example diagram illustrating details of an example phase according to embodiments herein.

As shown, the controller circuitry 140-B1 associated with more parts of phase 110-1 receives random number data 146 as well as control information 145. As further described herein, and in the following FIGS., each of the phases uses the received control information 145 and random number data 146 to control the respective phase for a given control cycle.

In this example embodiment, based on the received inputs and configuration settings of controller circuitry 140-B1, controller circuitry 140-B1 outputs control signals to switch the control switch 150 (e.g., high side switch), synchronous switch 160 (e.g., low side switch), and synchronous switch 170 ON and OFF. If desired, note that each of the phases 110 can be configured as a multi-phase semi-resonant converter as discussed in related U.S. patent application Ser. No. 15/335,715 entitled "MULTIPHASE POWER SUPPLY AND PHASE CONTROL," filed on Oct. 27, 2016, the entire teachings of which are incorporated herein by this reference.

Switching operation of the control switch 150, synchronous switch 160, and synchronous switch 170 produces output voltage 190 to power load 118.

In one embodiment, the controller circuitry 140-B1 generates signals controlling the driver circuits 115-1, 115-2, and 115-3 based on control signals (such as control information 145 and random number data 146) received from the controller circuitry 140-A and randomizer resource 120. As an alternative to example phases as shown in FIG. 2, embodiments herein include generating any suitable sequence of switching signals to deliver a quantum of charge to the output. In other words, use of one or more phases as shown in FIG. 2 may be replaced by any suitable combination of switches (and switching sequence), capacitors, inductors to produce a fixed quantum of charge to the output capacitor and load to produce the output voltage 190.

As previously discussed, in one embodiment, each of the phases is a DC to DC converter circuit to sink or source energy to regulate a output voltage. In one embodiment, each of the multiple phases 110 is operable to output a substantially same (such as within a tolerance of 10% of each other) amount energy, current, etc., if activated for a given cycle. Note again that the phases can be any suitable resource to deliver a quantum of energy to a load. Use of a buck converter, semi resonant bucke converter, etc., is shown by way of non-limiting example embodiment.

Figure 3:
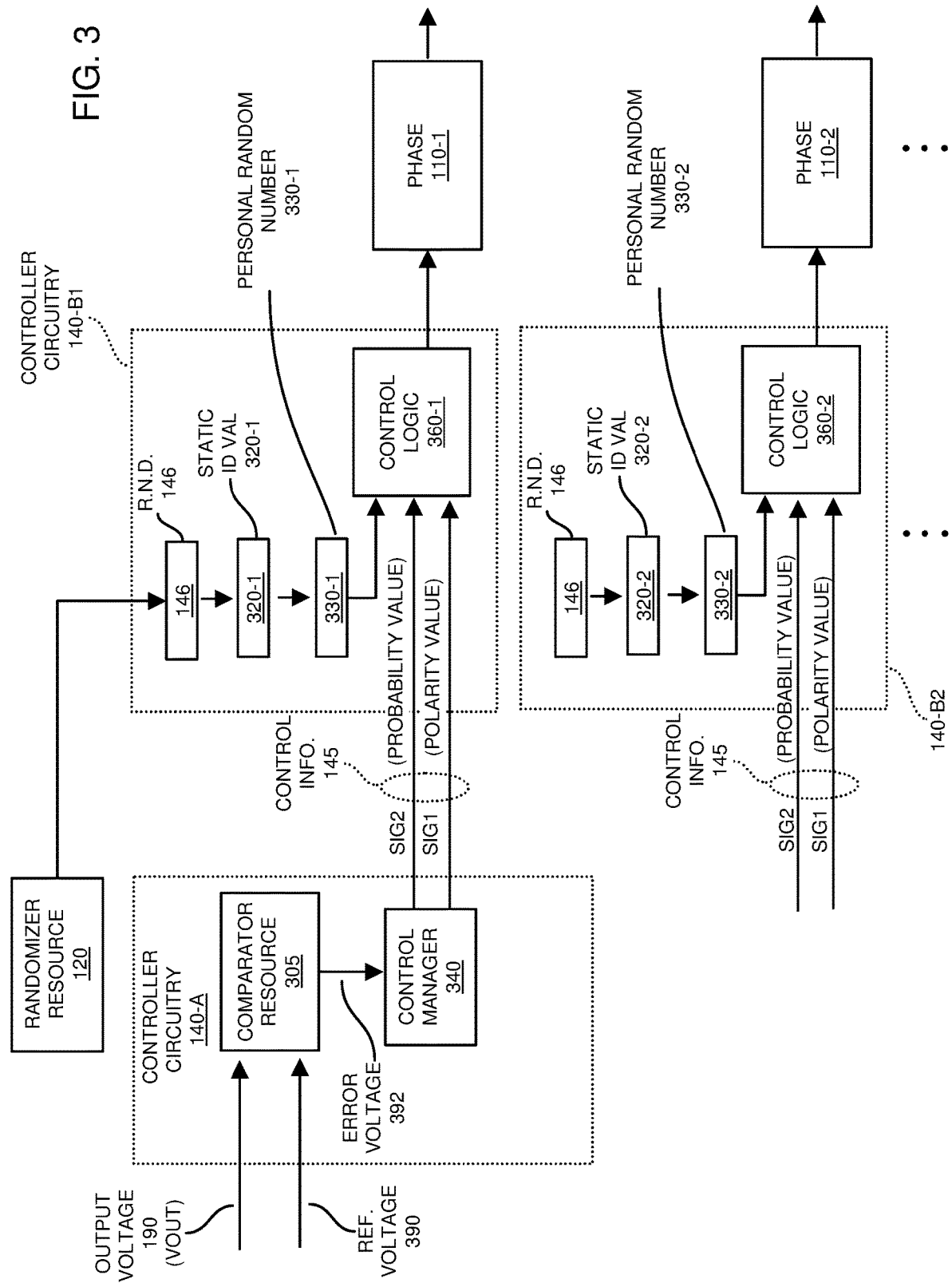
FIG. 3 is an example diagram illustrating generating personal random number values and use of general control information (from a centralized controller) to control respective phases according to embodiments herein.

FIG. 3 is an example diagram illustrating generation of personal random number values and use of control information from a centralized controller to control respective phases according to embodiments herein.

As shown, in one embodiment, the control circuitry 140-A includes comparator resource 205 and control manager 340. During operation, the comparator resource 305 compares the output voltage 190 to a reference voltage 390. Comparator resource 305 produces error voltage 392 (indicative of a difference between the output voltage 190 and the reference voltage 390) and inputs it to control manager 340.

Control manager 340 (such as a Proportional-Integral-Derivative controller (PID), Proportional-Integral controller (PI), or other suitable controller circuit) analyzes the magnitude and polarity of the error voltage 392 over time and produces, for each of multiple control cycles, respective control information 145 including a probability value and a polarity value.

Via the polarity value (such as a setting of a positive value), the control information 145 indicates that the phases 110 should source current to the load such as because the output voltage 190 is less than the reference voltage 390. Conversely, via the polarity value (such as a setting of a negative value), the control information 145 indicates that the phases 110 should sink current from the load in the output capacitor because the output voltage 190 is greater than the reference voltage 390.

In addition to generating the polarity value (signal #1), the control manager 340 also generates the control information 145 to include a probability value (signal #2) for a respective control cycle. In one embodiment, each of the phases 110 is configured to output a substantially same predetermined quantum of energy if it is activated for a given control cycle. In one non-limiting example embodiment, based on a magnitude of the difference between the output voltage 190 and the reference voltage 390, the control manager 340 produces the probability value to indicate how many of the phases is to be activated to reduce the error voltage 392 such that the output voltage 190 stays within regulation over time.

In accordance with further embodiments, the control manager 340 generates the probability value for a given control cycle to be between zero (0%) and 1.0 (100%). A magnitude of the probability value indicates what percentage of all the phases 110 to activate during the given control cycle to maintain the output voltage 190 within regulation.

For example, a probability value setting of 0% (0.0) indicates to activate none of the phases 110 for a respective control cycle; a probability value setting of 10% (0.1) indicates that each phase has a 10% chance of being active; this results in approximately 10% of the phases 110 to be active for a respective control cycle. A probability value setting of 20% (0.2) indicates that each phase has a 20% chance of being active; this results in approximately 20% of the phases 110 to be active for a respective control cycle; and so on.

Thus, in this example embodiment, the control manager 340 of control circuitry 140-A may indicate the probability of phase activation via the probability value. However, the control manager 340 does not indicate which of the phases to activate. Instead, each respective control circuitry 140-B associated with the phases 110 independently determines whether or not to activate the face for the given control cycle.

For example, as previously discussed, the randomizer resource 120 produces different random number data 146 for each of multiple control cycles to randomize activation of the different phases for a given control cycle. During operation, each of the phases 110 receives the random number data 146 generated by the randomizer resource 120 for the given control cycle. Additionally, each of the phases is assigned a unique static identifier value with respect to other phases. The unique status identifier values do not change cycle over cycle. For example, phase 110-1 is assigned static identifier value 320-1; phase 110-2 is assigned static identifier value 320-2; and so on.

For a given control cycle, a respective phase applies the received random number data 146 to its corresponding static identifier value 320 assigned to that phase to produce a personal random number value 330 for the control given cycle. As discussed below, using the random number data 146, the personal random number value 330 assigned to each of the phases 110 changes for each control cycle.

Control Cycle #1

As a more specific example, for the first control cycle (control cycle #1), assume that the randomizer resource 120 produces first random number data 146-1 (such as a first random string of binary data). In such an instance, the controller circuitry 140-B1 applies (such as via any suitable function such as XOR function, etc) the received random number data 146-1 to the static identifier value 320-1 (first unique string of binary data that is the same for each of multiple control cycles) assigned to the phase 110-1. Based on application of the random number data 146-1 to the static identifier value 320-1, the controller circuitry 140-B1 produces unique personal random number value 330-1 for phase 110-1 for cycle #1.

The control logic 360-1 associated with controller circuitry 140-B1 uses a combination of the personal random number value 330-1 for control cycle #1 and the probability value (from control information 145) received from the control manager 340 to determine whether or not to activate the phase 110-1 for the control cycle #1.

Further in this example embodiment, for control cycle #1, the controller circuitry 140-B2 for phase 110-2 receives the first random number data 146-1. As previously discussed, each phase uses the received first random number data 146-1 to create a personal random number for the given cycle. In such an instance, the controller circuitry 140-B2 applies (such as via any suitable function such as XOR function, etc) the received random number data 146-1 to the static identifier value 320-2 (second unique string of binary data that stays the same for each of multiple control cycles) assigned to the phase 110-2. Based on application of the random number data 146-1, the controller circuitry 140-B2 produces unique personal random number value 330-2 for phase 110-2. The control logic 360-2 associated with controller circuitry 140-B2 uses a combination of the personal random number value 330-2 for control cycle #1 and the probability value received from the control manager 340 to determine whether or not to activate the phase 110-2 for the control cycle #1.

As further discussed below, the random number data 146-1 (as generated by the randomizer resource 120 for control cycle #1) is used as a basis to create personal random number values during the first control cycle.

Control Cycle #2

For the second control cycle (control cycle #2), assume that the randomizer resource 120 produces second random number data 146-2 (such as a second string of random binary data). In such an instance, the controller circuitry 140-B1 applies (such as via any suitable function such as XOR function, etc) the received random number data 146-2 to the static identifier value 320-1 (first unique string of binary data that is the same for each of multiple control cycles) assigned to the phase 110-1. Based on application of the random number data 146-2 to the static identifier value 320-1, the controller circuitry 140-B1 produces unique personal random number value 330-1 for phase 110-1. The control logic 360-1 associated with controller circuitry 140-B1 uses a combination of the personal random number value 330-1 for control cycle #2 and the probability value received from the control manager 340 to determine whether or not to activate the phase 110-1 for the control cycle #2.

Further in this example embodiment, for control cycle #2, assume that the controller circuitry 140-B2 receives the second random number data 146-2. As previously discussed, each phase uses the received second random number data 146-2 to create personal random number value for the given cycle. In such an instance, the controller circuitry 140-B2 applies (such as via any suitable function such as XOR function, etc) the received random number data 146-2 for cycle #2 to the static identifier value 320-2 (second unique string of binary data that is the same for each of multiple control cycles) assigned to the phase 110-2. Based on application of the random number data 146-2, the controller circuitry 140-B2 produces unique personal random number value 330-2 for phase 110-2 for cycle #2. The control logic 360-2 associated with controller circuitry 140-B2 uses a combination of the personal random number value 330-2 for control cycle #2 and the probability value received from the control manager 340 to determine whether or not to activate the phase 110-2 for the control cycle #2.

In this manner, each of the phases 110 in the power converter circuit 100 generates a personal random number value for each control cycle. As further discussed below, the random number data 146-2 is used as a basis to create personal random number values during the first control cycle.

In one embodiment, generating personal random numbers by each of the phases 110 as discussed herein ensures that the personal random number values for the phases are distributed evenly in a respective range. In accordance with further embodiments, the respective control circuitry associated with the phase can be configured to convert the personal random number value 330 for a respective phase into a normalized unique value between 0.0 and 1.0. The respective control logic 360 in the controller circuitry 140-B1 uses the normalized random number value between 0.0 and 1.0 and the received probability value from control information 145 to determine whether or not to activate the respective phase for the given control cycle.

More specifically, the received probability value for the given control cycle provides a basis to determine whether or not to activate the phase. For example, as previously discussed, when the probability value in control information 145 indicates 0.6, 60% of all of the phases 110 will be activated for that control cycle; when the probability value in control information 145 indicates 0.2, 20% of all of the phases 110 will be activated for that control cycle; and so on.

As further discussed below, the respective controller circuitry 140-B uses the personal random number value to determine whether or not to activate the phase for the given control cycle. The polarity value in the control information 145 for the given control cycle indicates whether the phase sources or sinks current to maintain the output voltage 190 within a desired range.

Figure 4:
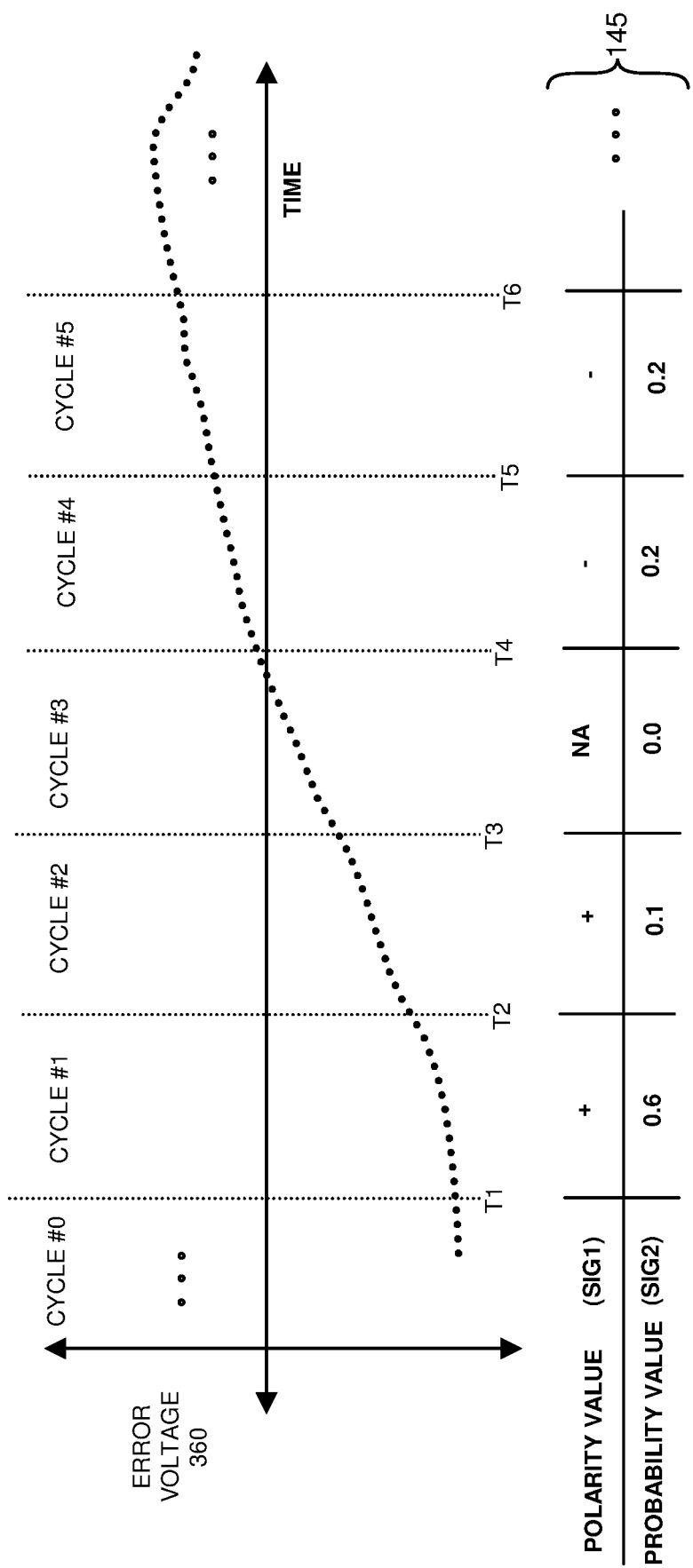
FIG. 4 is an example timing diagram illustrating an error voltage and generation of corresponding control information according to embodiments herein.

FIG. 4 is an example timing diagram illustrating an error voltage and generation of corresponding control information according to embodiments herein.

Based on monitoring the error voltage 360, prior to and/or around time T1, assume that the controller circuitry 140-A detects that a output voltage 190 is less than a desired reference voltage 390 as shown. To maintain the output voltage 190 within regulation according to control rules implemented by control circuitry 140-A, the controller circuitry 140-A produces control information 145 (such as SIG1=+, SIG2=0.6) for control cycle #1. In such an instance, via SIG1=+, the control information 145 indicates that the output voltage 190 is below a threshold value and that (positive) current should be outputted by a respective phase if it is activated for the given control cycle #1. Additionally, the control information 145 indicates a probability value of 0.6 (60%) to indicate that a first randomized set of phases (such as 60% of all of the phases) should be activated in the control cycle #1 to source current to the load 118.

Based on monitoring the error voltage 360, prior to and/or around time T2, the controller circuitry 140-A detects that a output voltage 190 is less than a desired reference voltage 390. To maintain the output voltage 190 within regulation, the controller circuitry 140-A produces control information 145 (such as SIG1=+, SIG2=0.1) for control cycle #2. In such an instance, via SIG1=+, the control information 145 indicates that the output voltage 190 is below a threshold value and that positive current should be outputted by a respective phase if it is activated for the given control cycle #2. Additionally, the control information 145 indicates a probability value of 0.1 (10%) to indicate that a second random set of phases (such as 10% of all of the phases) should be activated in the control cycle #2 to source current to the load 118.

Based on monitoring the error voltage 360, prior to and/or around time T3, assume that the controller circuitry 140-A detects that a output voltage 190 is approximately equal to reference voltage 390. To maintain the output voltage 190 within regulation, the controller circuitry 140-A produces control information 145 (such as SIG1=N/A, SIG2=0.0) for control cycle #3. In such an instance, via SIG1=N/A, the control information 145 indicates that the output voltage 190 is approximately equal to reference voltage 390 and that no current should be outputted by a respective phase for the given control cycle #3. Additionally, the control information 145 indicates a probability value of 0.0 (0%) to indicate that no phases (such as 0% of all of the phases) should be activated in the control cycle #3.

Based on monitoring the error voltage 360, prior to and/or around time T4, assume that the controller circuitry 140-A detects that a output voltage 190 is greater than a desired reference voltage 390. To maintain the output voltage 190 within regulation, the controller circuitry 140-A produces control information 145 (such as SIG1=−, SIG2=0.2) for control cycle #4. In such an instance, via SIG1=−, the control information 145 indicates that the output voltage 190 is above a threshold value and that negative current should be sunk by a respective phase if it is activated for the given control cycle #4. Additionally, the control information 145 indicates a probability value of 0.2 (20%) to indicate that a random set of phases (such as 20% of all of the phases) should be activated in the control cycle #2 to sink current from the load 118.

Based on monitoring the error voltage 360, prior to and/or around time T5, assume that the controller circuitry 140-A detects that a output voltage 190 is greater than a desired reference voltage 390. To maintain the output voltage 190 within regulation, the controller circuitry 140-A produces control information 145 (such as SIG1=−, SIG2=0.2) for control cycle #5. In such an instance, via SIG1=−, the control information 145 indicates that the output voltage 190 is above a threshold value and that current should be sunk by a respective phase if it is activated for the given control cycle #5. Additionally, the control information 145 indicates a probability value of 0.2 (20%) to indicate that a random set of phases (such as 20% of all of the phases) should be activated in the control cycle #2 to sink current from the load 118.

Figure 5:
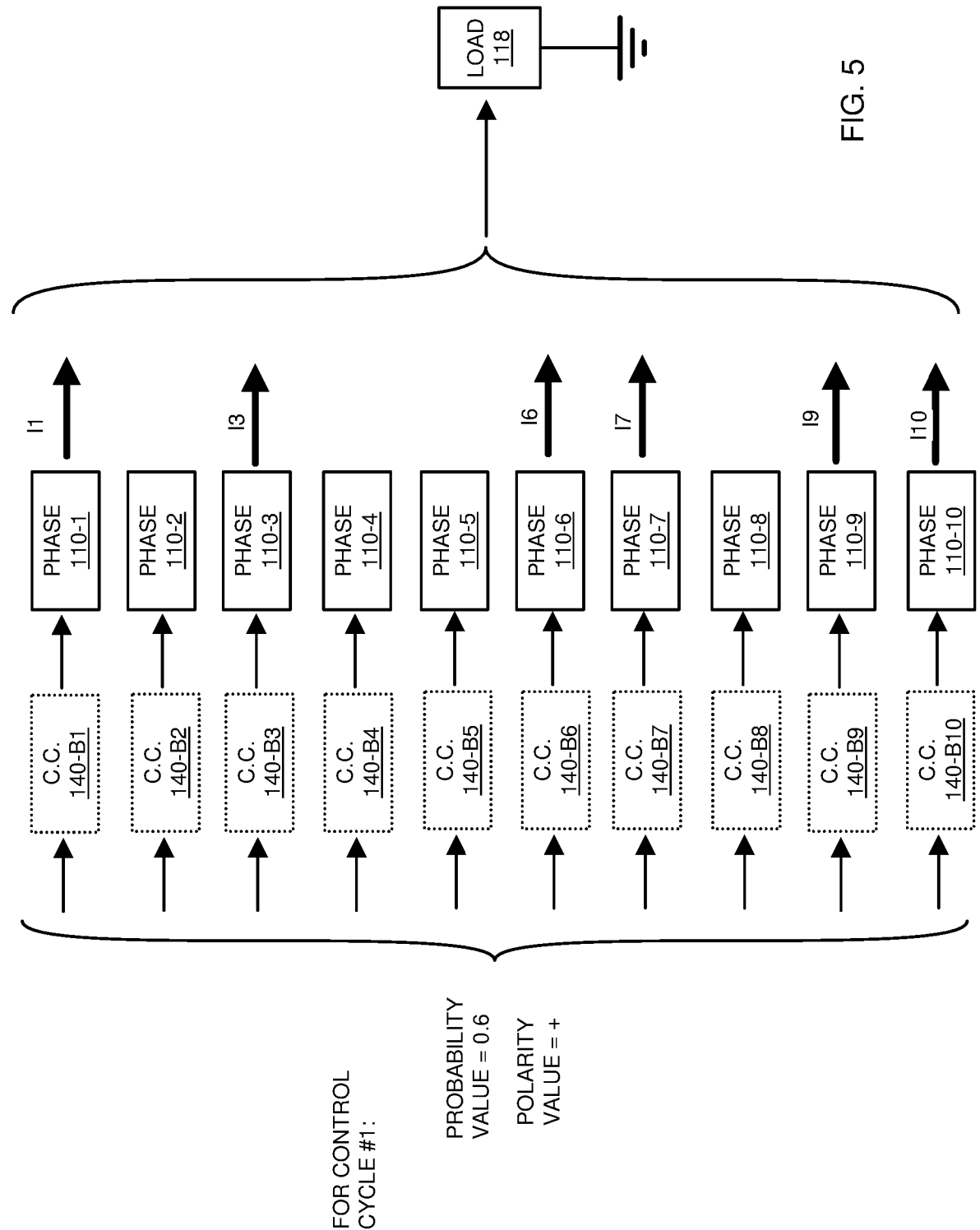
FIG. 5 is an example diagram illustrating randomized activation of a number of phases during a first control cycle according to embodiments herein.

FIG. 5 is an example diagram illustrating randomized activation of a number of phases during a first control cycle according to embodiments herein.

As shown in this example embodiment, the control circuitry (such as each of controller circuitry 140-B1, controller circuitry 140-B2, controller circuitry 140-B3, controller circuitry 140-B4, etc.) associated with each of the phases 110 receives the control information 145 (such as probability value=0.6, polarity value=+, for cycle #1 as in FIG. 4) generated by the controller circuitry 140-A. Additionally, as previously discussed, each phase controller circuitry (such as controller circuitry 140-B1, controller circuitry 140-B2, controller circuitry 140-B3, controller circuitry 140-B4, etc.) receives, for cycle #1, random number data 146-1 (such as a first random number) from the randomizer resource 120.

In one embodiment, as previously discussed, the personal random number value assigned to the phase can be converted or normalized into a corresponding normalized value between 0.0 and 1.0.

As an example, for cycle #1, assume that the control circuitry 140-B1 converts the personal random number value 330-1 assigned to phase 110-1 into a normalized value of 0.01; assume that the control circuitry 140-B2 converts the personal random number value 330-2 assigned to phase 110-2 into a normalized value of 0.62; assume that the control circuitry 140-B3 converts the personal random number value 330-3 assigned to phase 110-3 into a normalized value of 0.38; assume that the control circuitry 140-B4 converts the personal random number value 330-4 assigned to phase 110-4 into a normalized value of 0.98; assume that the control circuitry 140-B5 converts the personal random number value 330-5 assigned to phase 110-5 into a normalized value of 0.85; assume that the control circuitry 140-B6 converts the personal random number value 330-6 assigned to phase 110-6 into a normalized value of 0.13; assume that the control circuitry 140-B7 converts the personal random number value 330-7 assigned to phase 110-7 into a normalized value of 0.59; assume that the control circuitry 140-B8 converts the personal random number value 330-8 assigned to phase 110-8 into a normalized value of 0.78; assume that the control circuitry 140-B9 converts the personal random number value 330-9 assigned to phase 110-9 into a normalized value of 0.27; assume that the control circuitry 140-B10 converts the personal random number value 330-10 assigned to phase 110-10 into a normalized value of 0.41.

Each respective control logic 360 associated with a phase compares a respective normalized value to the probability value as specified by the control information 145 to determine whether to activate the phase for the given control cycle. Any phase that detects that the generated value is less than the received probability value of 0.6 turns ON for the respective control cycle to supply a predetermined quantum of energy, charge, current, etc., to the output capacitor 125 and load 118.

For control cycle #1, as indicated by probability value equal to 0.6, in a manner as previously discussed, a randomized set of 60% of the phases 110 (6 out of 10 phases or those with a respective normalized value less than 0.6) detects that they should be activated to supply a quantum of energy to the output capacitor 125 and load 118. In this example embodiment, phase 110-1, phase 110-3, phase 110-6, phase 110-7, phase 110-9, and phase 110-10 detect that they are to be activated during the control cycle #1. In such an instance, for control cycle #1, this randomized set of phases collectively outputs respective current I1, I3, I6, I7, I9, and I10 to power the load 118.

Figure 6:
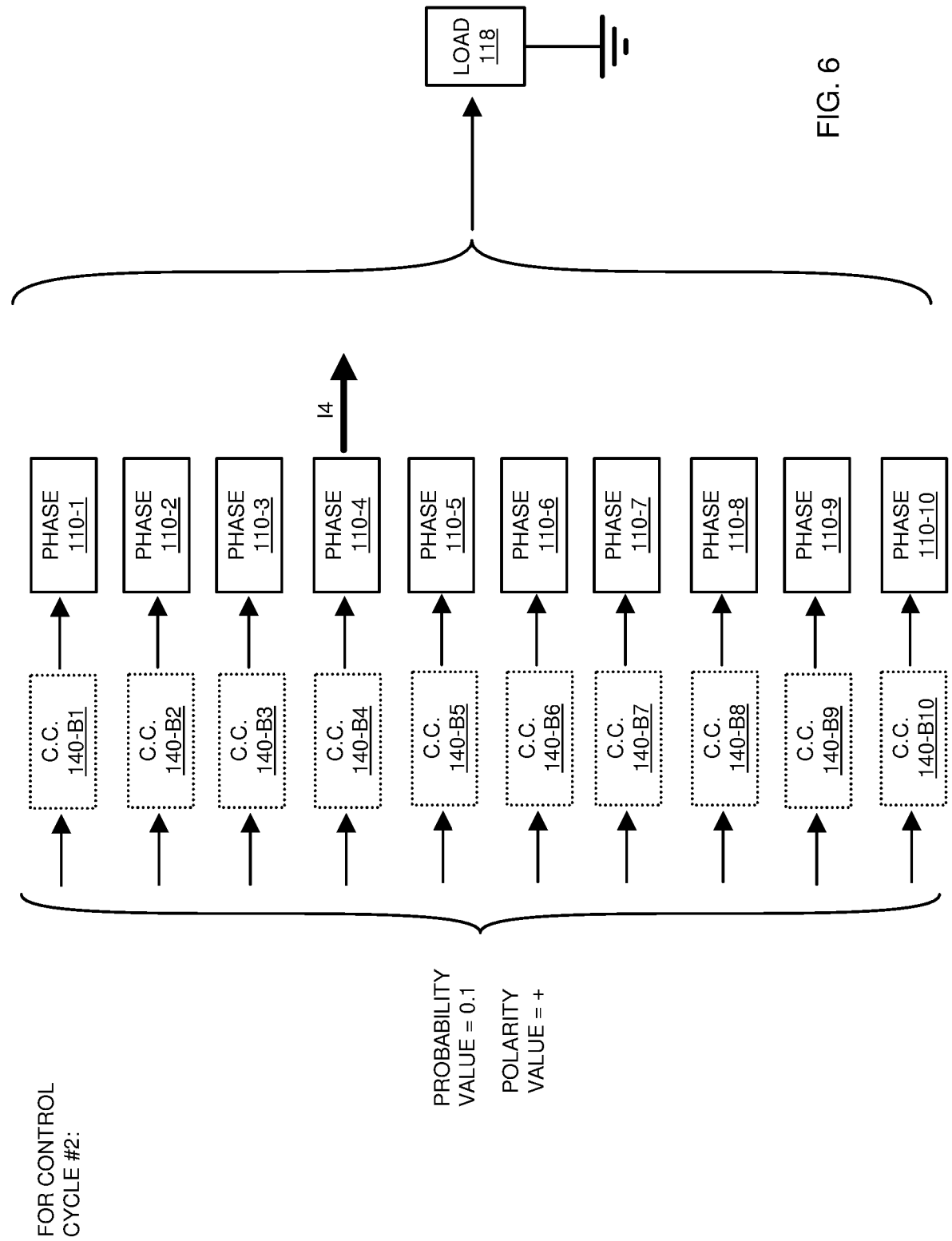
FIG. 6 is an example diagram illustrating randomized activation of a number of phases during a second control cycle according to embodiments herein.

FIG. 6 is an example diagram illustrating randomized activation of a number of phases during a second control cycle according to embodiments herein.

As shown in this example embodiment, the control circuitry (such as controller circuitry 140-B1, controller circuitry 140-B2, controller circuitry 140-B3, controller circuitry 140-B4, etc.) associated with each of the phases 110 receives the control information 145 (such as probability value=0.1, polarity value=+ for cycle #2 as shown and discussed in FIG. 4) generated by the controller circuitry 140-A. Additionally, as previously discussed, each phase controller circuitry (such as controller circuitry 140-B1, controller circuitry 140-B2, controller circuitry 140-B3, controller circuitry 140-B4, etc.) receives second random number data 146-2 (such as a second random number) from the randomizer resource 120 for cycle #2.

As previously discussed, the personal random number value assigned to the phase can be converted or normalized into a value between 0.0 and 1.0. As an example, for cycle #2, assume that the control circuitry 140-B1 converts the personal random number value 330-1 assigned to phase 110-1 into a normalized value of 0.45; assume that the control circuitry 140-B2 converts the personal random number value 330-2 assigned to phase 110-2 into a normalized value of 0.69; assume that the control circuitry 140-B3 converts the personal random number value 330-3 assigned to phase 110-3 into a normalized value of 0.71; assume that the control circuitry 140-B4 converts the personal random number value 330-4 assigned to phase 110-4 into a normalized value of 0.02; assume that the control circuitry 140-B5 converts the personal random number value 330-5 assigned to phase 110-5 into a normalized value of 0.36; assume that the control circuitry 140-B6 converts the personal random number value 330-6 assigned to phase 110-6 into a normalized value of 0.21; assume that the control circuitry 140-B7 converts the personal random number value 330-7 assigned to phase 110-7 into a normalized value of 0.85; assume that the control circuitry 140-B8 converts the personal random number value 330-8 assigned to phase 110-8 into a normalized value of 0.51; assume that the control circuitry 140-B9 converts the personal random number value 330-9 assigned to phase 110-9 into a normalized value of 0.19; assume that the control circuitry 140-B10 converts the personal random number value 330-10 assigned to phase 110-10 into a normalized value of 0.93.

For control cycle #2, as indicated by probability value equal to 0.1, in a manner as previously discussed, a randomized set of 10% of the phases 110 (1 out of 10 phases or those phases having a normalized value less than 0.1) detects that they should be activated to supply a predetermined quantum of energy, charge, current, etc., to the load 118. Assume in this example embodiment that phase 110-4 detects that it is to be activated during the control cycle #2. In such an instance, for control cycle #2, this randomized set of phases collectively outputs respective current I4 to output capacitor 125 to power the load 118.

Figure 7:
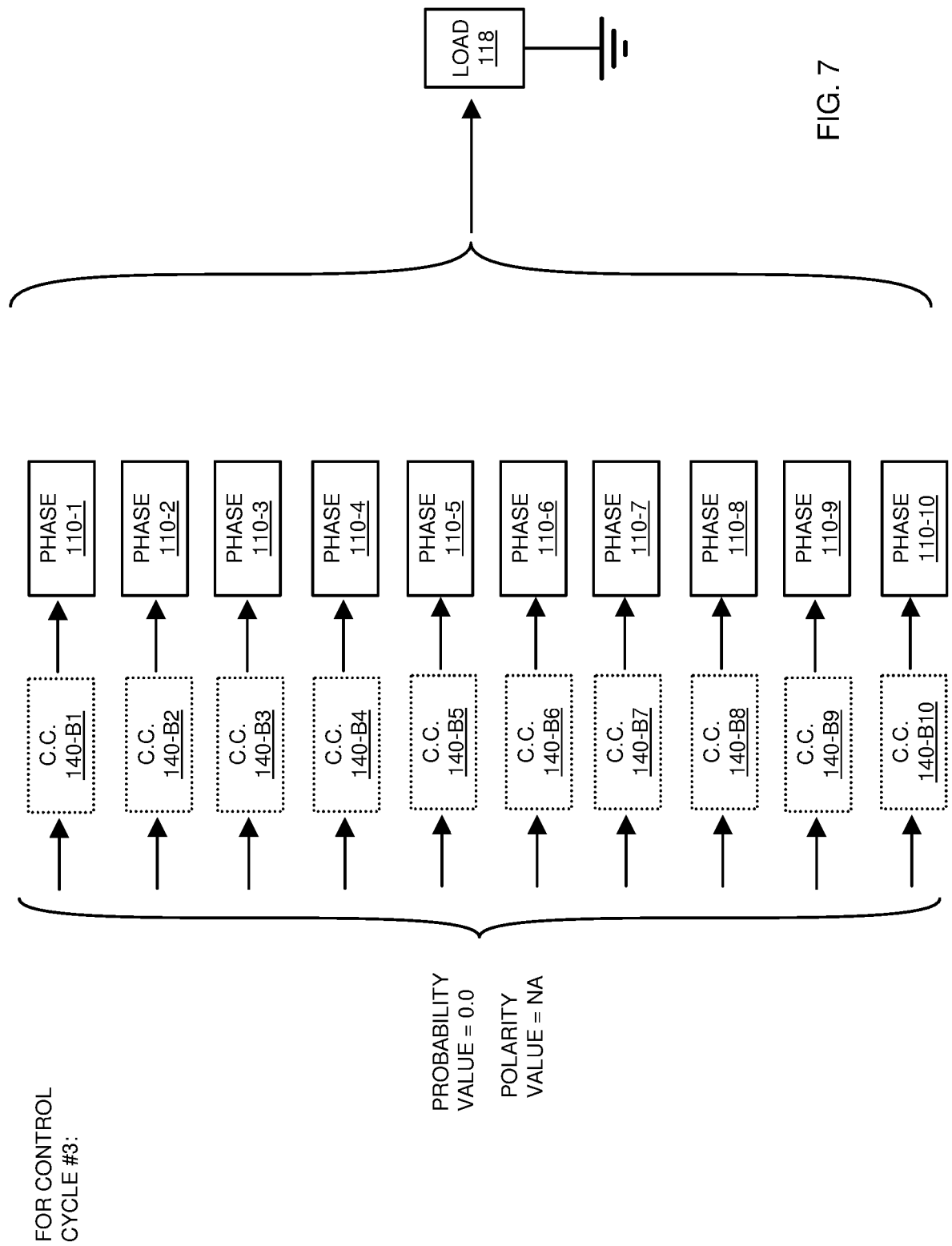
FIG. 7 is an example diagram illustrating operation of multi-phase power supply circuit phases during a third control cycle according to embodiments herein.

FIG. 7 is an example diagram illustrating randomized activation of a number of phases during a third control cycle according to embodiments herein.

As shown in this example embodiment, the control circuitry (such as controller circuitry 140-B1, controller circuitry 140-B2, controller circuitry 140-B3, controller circuitry 140-B4, etc.) associated with each of the phases 110 receives the control information 145 (such as probability value=0.0, polarity value=N/A for cycle #3 as in FIG. 4) generated by the controller circuitry 140-A. Additionally, as previously discussed, each phase controller circuitry (such as controller circuitry 140-B1, controller circuitry 140-B2, controller circuitry 140-B3, controller circuitry 140-B4, etc.) receives random number data 146 (such as a third random number) from the randomizer resource 120.

For control cycle #3, as indicated by probability value equal to 0.0, and in a manner as previously discussed, none of the phases 110 detects that they should be activated to supply a quantum of energy, charge, current, etc., to the load 118. In such an instance, for control cycle #3, no phases are activated.

Figure 8:
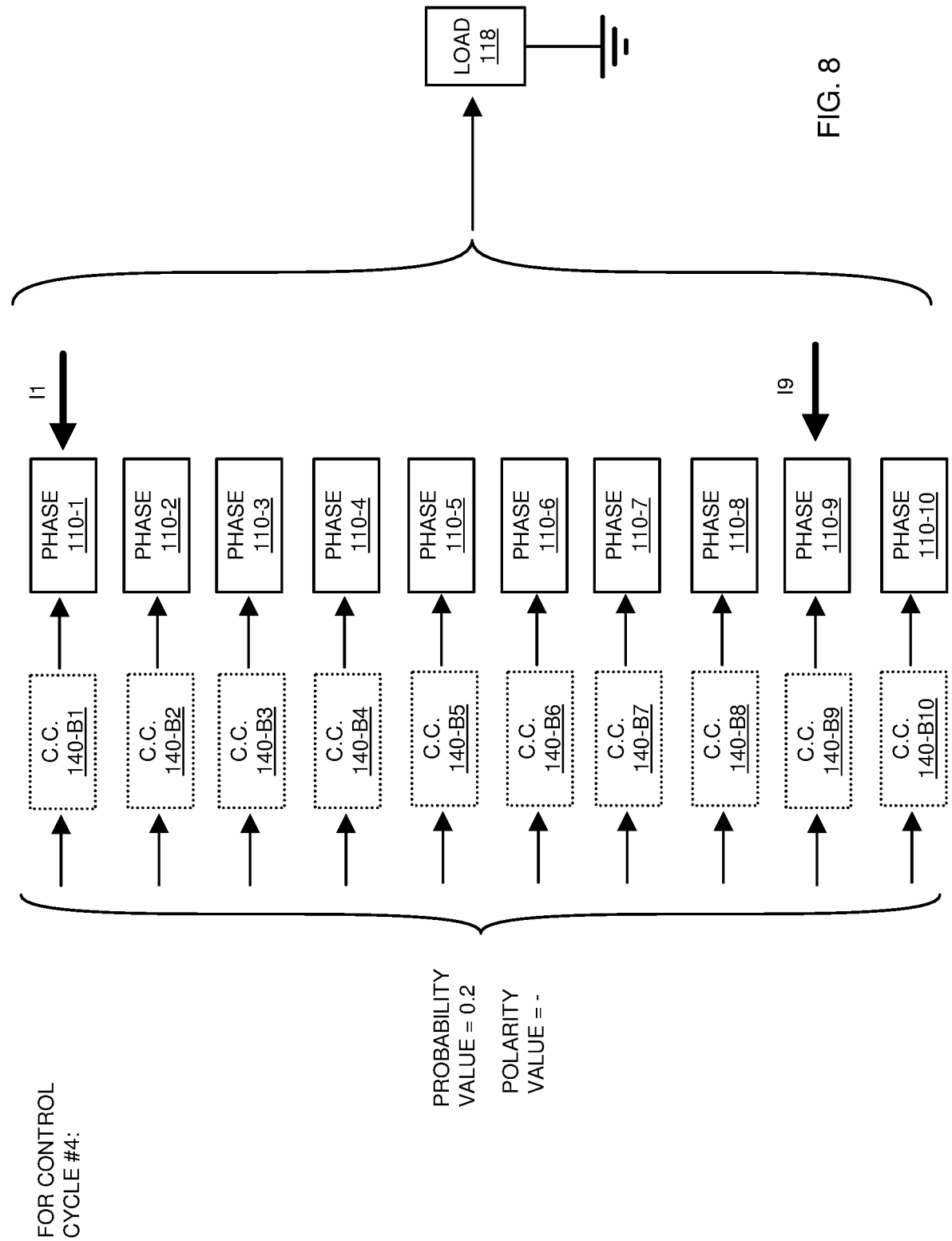
FIG. 8 is an example diagram illustrating randomized activation of a number of phases during a fourth control cycle according to embodiments herein.

FIG. 8 is an example diagram illustrating randomized activation of a number of phases during a fourth control cycle according to embodiments herein.

As shown in this example embodiment, the control circuitry (such as controller circuitry 140-B1, controller circuitry 140-B2, controller circuitry 140-B3, controller circuitry 140-B4, etc.) associated with each of the phases 110 receives the control information 145 (such as probability value=0.2, polarity value=− for cycle #4 as in FIG. 4) generated by the controller circuitry 140-A. Additionally, as previously discussed, each phase controller circuitry (such as controller circuitry 140-B1, controller circuitry 140-B2, controller circuitry 140-B3, controller circuitry 140-B4, etc.) receives random number data 146 (such as a fourth random number) from the randomizer resource 120.

As previously discussed, the personal random number value assigned to the phase can be converted or normalized into a value between 0.0 and 1.0. As an example, for cycle #4, assume that the control circuitry 140-B1 converts the personal random number value 330-1 assigned to phase 110-1 into a normalized value of 0.05; assume that the control circuitry 140-B2 converts the personal random number value 330-2 assigned to phase 110-2 into a normalized value of 0.62; assume that the control circuitry 140-B3 converts the personal random number value 330-3 assigned to phase 110-3 into a normalized value of 0.25; assume that the control circuitry 140-B4 converts the personal random number value 330-4 assigned to phase 110-4 into a normalized value of 0.71; assume that the control circuitry 140-B5 converts the personal random number value 330-5 assigned to phase 110-5 into a normalized value of 0.36; assume that the control circuitry 140-B6 converts the personal random number value 330-6 assigned to phase 110-6 into a normalized value of 0.49; assume that the control circuitry 140-B7 converts the personal random number value 330-7 assigned to phase 110-7 into a normalized value of 0.88; assume that the control circuitry 140-B8 converts the personal random number value 330-8 assigned to phase 110-8 into a normalized value of 0.92; assume that the control circuitry 140-B9 converts the personal random number value 330-9 assigned to phase 110-9 into a normalized value of 0.17; assume that the control circuitry 140-B10 converts the personal random number value 330-10 assigned to phase 110-10 into a normalized value of 0.55.

For control cycle #4, as indicated by probability value equal to 0.2, in a manner as previously discussed, a randomized set of 20% of the phases 110 (2 out of 10 phases or those phases having a normalized value less than 0.2) detects that they should be activated to sink a predetermined quantum of energy, charge, current, etc., from the output capacitor 125 and load 118. Assume in this example embodiment that phase 110-1 and 110-9 detect that they should be activated during the control cycle #4. In such an instance, for control cycle #4, this randomized set of phases collectively sinks respective current I1 and I9 to maintain the output voltage 190 on the output capacitor 125.

Figure 9:
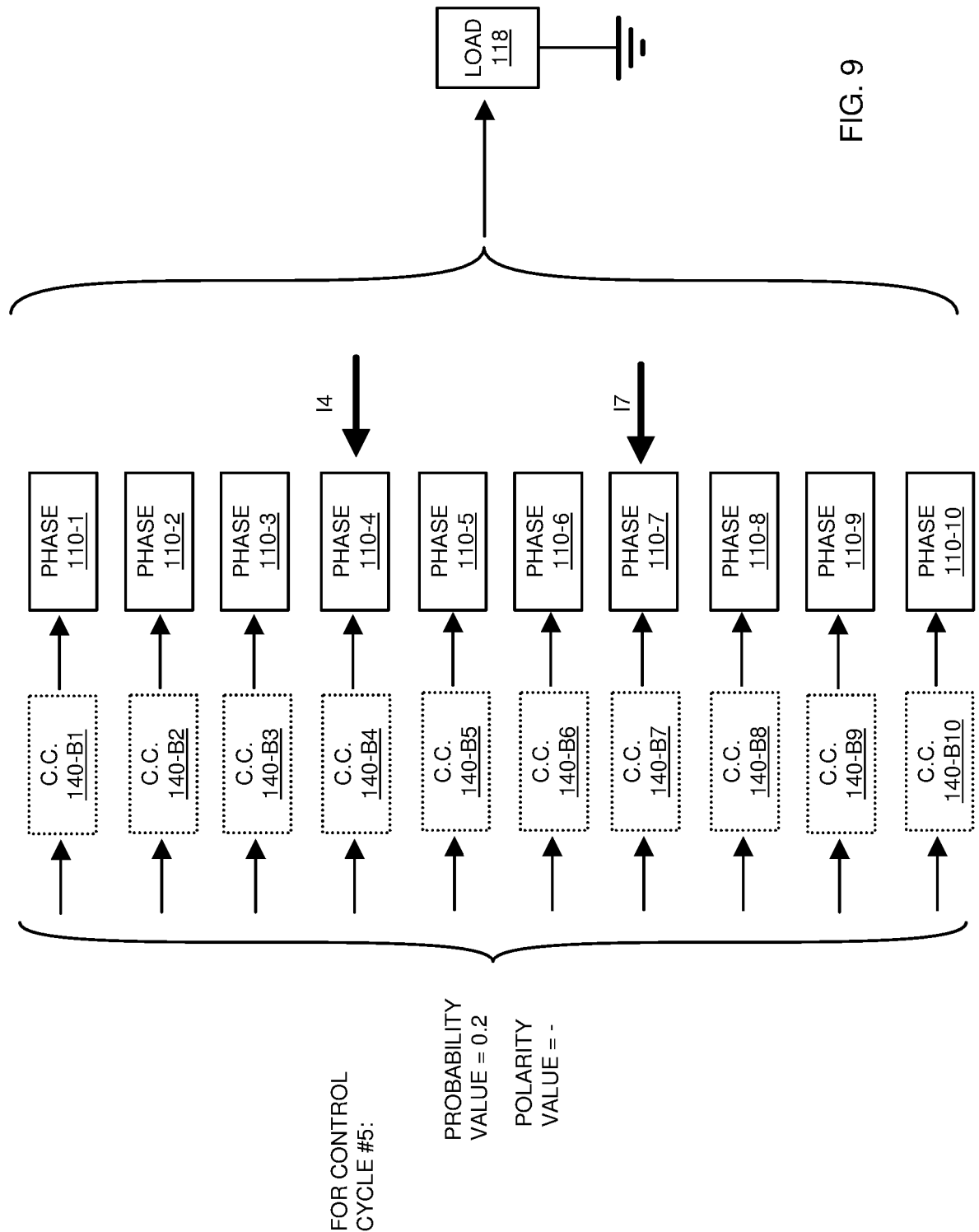
FIG. 9 is an example diagram illustrating randomized activation of a number of phases during a fifth control cycle according to embodiments herein.

FIG. 9 is an example diagram illustrating randomized activation of a number of phases during a fifth control cycle according to embodiments herein.

As shown in this example embodiment, the control circuitry (such as controller circuitry 140-B1, controller circuitry 140-B2, controller circuitry 140-B3, controller circuitry 140-B4, etc.) associated with each of the phases 110 receives the control information 145 (such as probability value=0.2, polarity value=− for cycle #5 as in FIG. 4) generated by the controller circuitry 140-A. Additionally, as previously discussed, each phase controller circuitry (such as controller circuitry 140-B1, controller circuitry 140-B2, controller circuitry 140-B3, controller circuitry 140-B4, etc.) receives random number data 146 (such as a fifth random number for control cycle #5) from the randomizer resource 120.

As previously discussed, the personal random number value assigned to each phase can be converted or normalized into a value between 0.0 and 1.0. As an example, for cycle #5, assume that the control circuitry 140-B1 converts the personal random number value 330-1 assigned to phase 110-1 into a normalized value of 0.29; assume that the control circuitry 140-B2 converts the personal random number value 330-2 assigned to phase 110-2 into a normalized value of 0.83; assume that the control circuitry 140-B3 converts the personal random number value 330-3 assigned to phase 110-3 into a normalized value of 0.58; assume that the control circuitry 140-B4 converts the personal random number value 330-4 assigned to phase 110-4 into a normalized value of 0.07; assume that the control circuitry 140-B5 converts the personal random number value 330-5 assigned to phase 110-5 into a normalized value of 0.41; assume that the control circuitry 140-B6 converts the personal random number value 330-6 assigned to phase 110-6 into a normalized value of 0.63; assume that the control circuitry 140-B7 converts the personal random number value 330-7 assigned to phase 110-7 into a normalized value of 0.12; assume that the control circuitry 140-B8 converts the personal random number value 330-8 assigned to phase 110-8 into a normalized value of 0.36; assume that the control circuitry 140-B9 converts the personal random number value 330-9 assigned to phase 110-9 into a normalized value of 0.75; assume that the control circuitry 140-B10 converts the personal random number value 330-10 assigned to phase 110-10 into a normalized value of 0.95.

For control cycle #5, as indicated by probability value equal to 0.2, in a manner as previously discussed, a randomized set of 20% of the phases 110 (2 out of 10 phases or those phases having a normalized value less than 0.2) detects that they should be activated to sink (because the polarity value for cycle #5 is negative) a predetermined quantum of energy, charge, current, etc., from output capacitor 125 and load 118. Assume in this example embodiment that phase 110-4 and 110-7 detect that they should be activated during the control cycle #5. In such an instance, for control cycle #5, this randomized set of phases collectively sinks respective current I4 and I7 to maintain the output voltage 190.

In accordance with further embodiments, note that each of the phases can be configured to keep track of a degree to which a respective phase was used on one or more recent control cycles. In one embodiment, each phase can be configured to generate a stamina value. In such an instance, to prevent overuse of any given phase, after activation of a phase, it might take a few clock cycles for the respective phase to be eligible again to deliver a packet of energy on a subsequent control cycle. In such an instance, in accordance with the stamina factor, assuming that a given phase recently delivered a quantum of energy on one or more prior (such as most recent) control cycles, using the stamina value, there is a lower probability that the given phase will be selected to generate a new packet is lower immediately after delivering a packet until it becomes available again after an amount of non-use. Thus, if desired, a recently overused phase can be temporarily placed on an ineligible list until the phase is unused for an appropriate number of subsequent control cycles.

Figure 10:
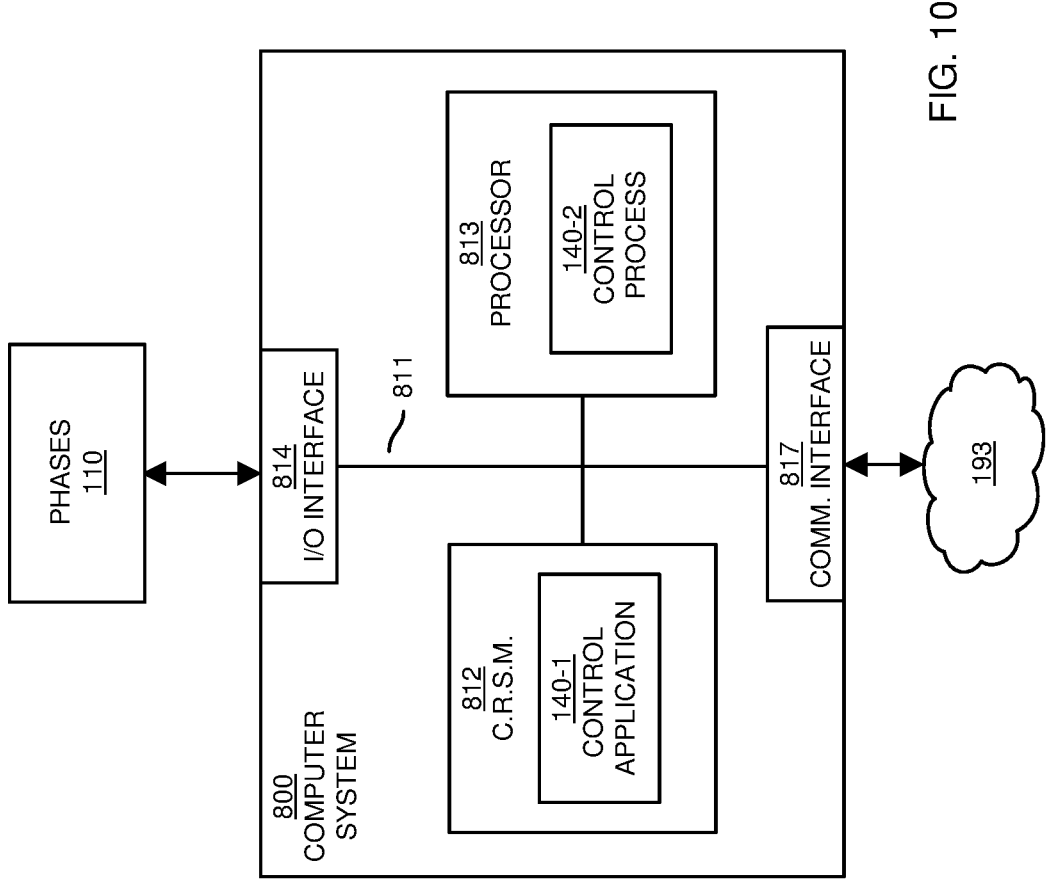
FIG. 10 is an example diagram illustrating computer processor hardware and related software instructions to execute methods according to embodiments herein.

FIG. 10 is an example block diagram of a computer device for implementing any of the operations as discussed herein according to embodiments herein.

As shown, computer system 800 (such as implemented by any resource such as controller circuitry 140 in power converter circuit 100) of the present example includes an interconnect 811 that couples computer readable storage media 812 such as a non-transitory type of media (i.e., any type of hardware storage medium) in which digital information can be stored and retrieved, a processor 813 (e.g., computer processor hardware such as one or more processor devices), I/O interface 814, and a communications interface 817.

I/O interface 814 provides connectivity to any suitable circuitry such as each of phases 110.

Computer readable storage medium 812 can be any hardware storage resource or device such as memory, optical storage, hard drive, floppy disk, etc. In one embodiment, the computer readable storage medium 812 stores instructions and/or data used by the control application 140-1 to perform any of the operations as described herein.

Further in this example embodiment, communications interface 817 enables the computer system 800 and processor 813 to communicate over a resource such as network 193 to retrieve information from remote sources and communicate with other computers.

As shown, computer readable storage media 812 is encoded with control application 140-1 (e.g., software, firmware, etc.) executed by processor 813. Control application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 in processor 813. In other words, the control process 140-2 associated with processor 813 represents one or more aspects of executing control application 140-1 within or upon the processor 813 in the computer system 800.

In accordance with different embodiments, note that computer system may be a micro-controller device configured to control a power supply and perform any of the operations as described herein.

Functionality supported by the different resources will now be discussed via flowcharts in FIGS. 11 and 12. Note that the steps in the flowcharts below can be executed in any suitable order.

Figure 11:
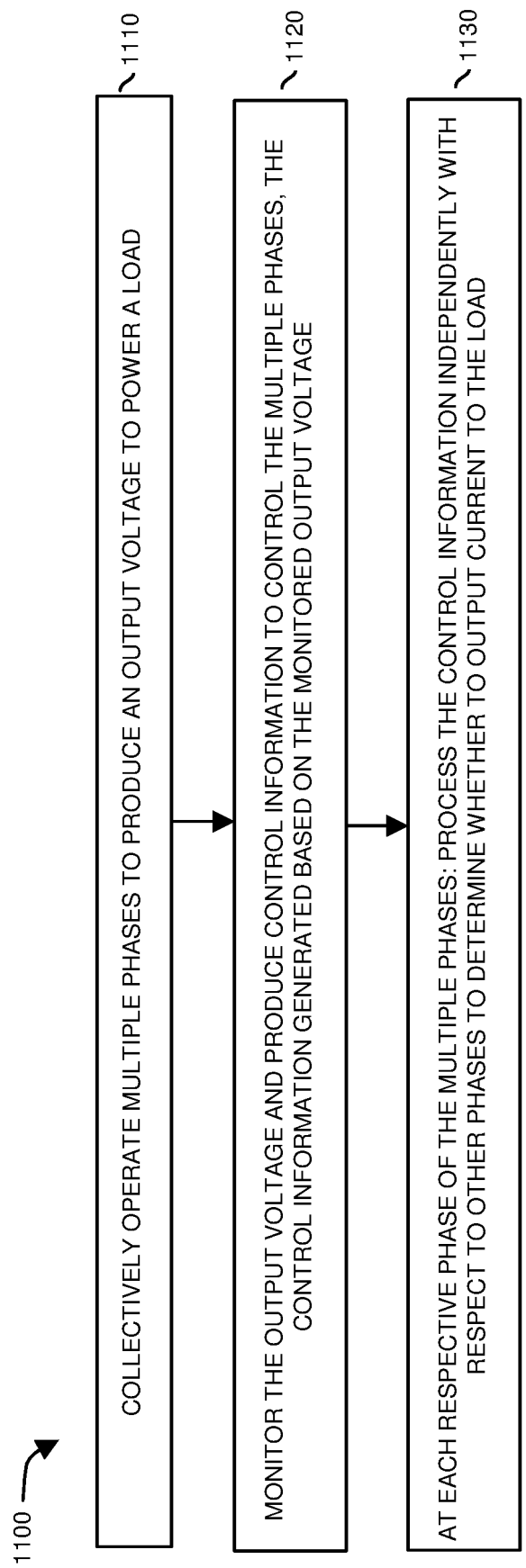
FIG. 11 is an example diagram illustrating a method according to embodiments herein.

FIG. 11 is a flowchart 1100 illustrating an example method according to embodiments herein. Note that there will be some overlap with respect to concepts as discussed above.

In processing operation 1110, the controller circuitry 140 operates multiple phases 110 over time to produce an output voltage to power a load.

In processing operation 1120, the controller circuitry 140 monitors a output voltage 190 and produces control information 145 to control the multiple phases 119. The controller circuitry 140 generates the control information 145 based on the monitored output voltage 190 and/or error voltage 392 derived from monitoring the output voltage 190.

In processing operation 1130, each respective phase of the multiple phases 110 processes the control information independently of other phases to determine whether to sink or source current to the load 118.

Figure 12:
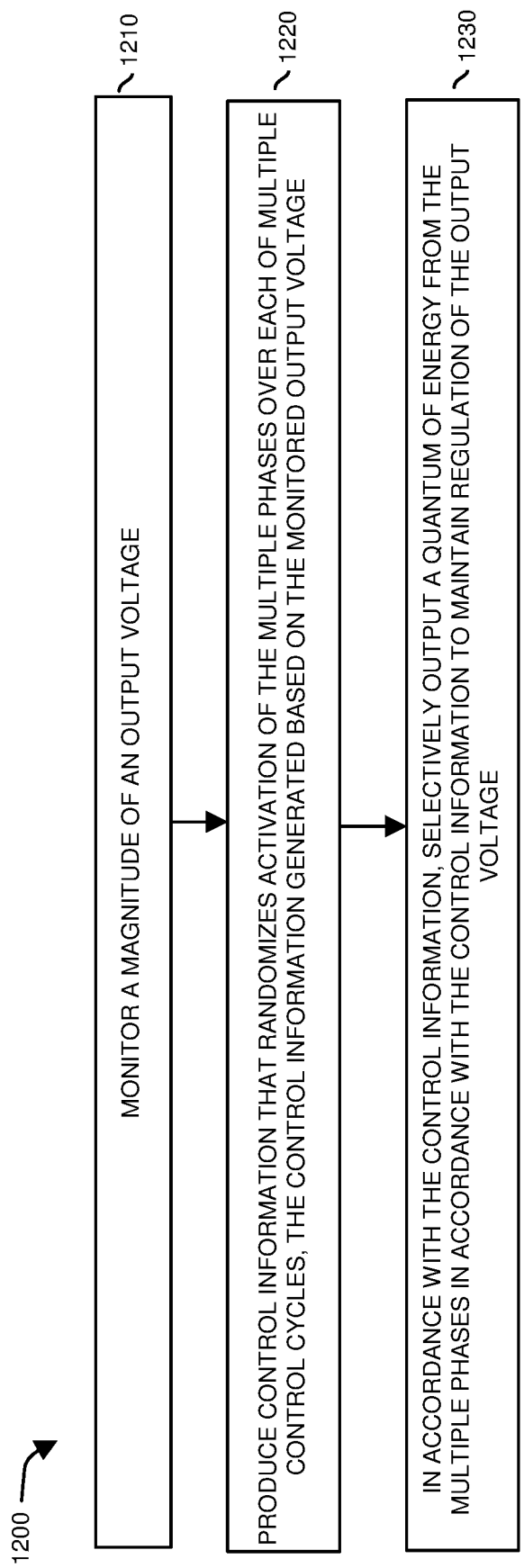
FIG. 12 is an example diagram illustrating a method according to embodiments herein.

FIG. 12 is a flowchart 1200 illustrating an example method according to embodiments herein. Note that the steps in the flowcharts below can be executed in any suitable order.

In processing operation 1210, the controller circuitry 140 monitors an output voltage 190.

In processing operation 1220, the controller circuitry 140 produces control information 145 that supports randomized activation of the multiple phases 110 over each of multiple control cycles. As previously discussed, in one embodiment, the controller circuitry 140-A generates the control information 145 based on the monitored output voltage 190.

In processing operation 1230, in accordance with the control information 145, and random number data 146 for a given control cycle, each of the phases 110 selectively outputs a quantum of energy in accordance with the control information to maintain regulation of the output voltage 190.

Note again that techniques herein are well suited for use in power converter circuit applications such as those that include DC-DC phases, semi-resonant DC-DC phases, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Further Summary and Permutations of Embodiments

Clause 1. A multi-phase power supply circuit comprising:
multiple phases that collectively operate to produce an output voltage to power a load;
a controller operable to monitor a magnitude the output voltage and produce control information to control the multiple phases, the control information generated based on the monitored output voltage; and each respective phase of the multiple phases operable to process the control information independently with respect to other phases to determine whether to output current to maintain regulation of the output voltage.

Clause 2. The multi-phase power supply circuit as in any clause, wherein the control information includes a first control parameter specifying a polarity of an error voltage derived from comparing a output voltage to a reference voltage, the polarity indicating whether the output voltage is greater than or less than the reference voltage; and wherein the control information includes a second control parameter whose magnitude varies depending on the error voltage, the magnitude of the second control parameter proportional to a relative number of phases to activate to reduce the error voltage.

Clause 3. The multi-phase power supply circuit as in any of one or more clauses further comprising:

a random number generator, the random number generator operable to produce a respective random number for each control cycle of multiple control cycles; and wherein each phase of the multiple phases is assigned a corresponding static unique identifier value, each respective phase of the multiple phases operable to apply the respective random number to the corresponding static unique identifier value to produce a respective unique personal random number value for the respective phase for a given control cycle, the respective phase using the respective personal random number value assigned to the respective phase and the control information to determine whether to activate the phase during the control cycle.

Clause 4. The multi-phase power supply circuit as in any of one or more clauses, wherein a number of phases to be activated for a given control cycle is predetermined based on a setting of the first control parameter (probability) and the distribution a distribution of the personal random numbers assigned to of the phases. but the selection of the phases to be activated in the given control cycle is random.

Clause 5. The multi-phase power supply circuit as in any of one or more clauses 1-6, wherein each of the phases activated during the given control cycle is operable to output a substantially same predetermined amount of energy for the given control cycle to maintain the output voltage.

Clause 6. The multi-phase power supply circuit as in any of one or more clauses, wherein the control information supports randomized activation of the multiple phases over each of multiple control cycles depending on received random number data.

Clause 7. A multi-phase power supply circuit comprising:

multiple phases that collectively operate to produce an output voltage to power a load;

control circuitry operable to monitor the output voltage and produce control information that supports randomized activation of the multiple phases over each of multiple control cycles, the control information generated based on the monitored magnitude of the outputoutput voltage; and each respective phase of the multiple phases operable to selectively supply current to the load to maintain regulation of the output voltage in accordance with the control information.

Clause 8. The multi-phase power supply circuit as in any of one or more clauses, wherein execution of the control information by each of the multiple phases results in: i) activation of a first random set of the multiple phases during a first control cycle of the multiple cycles, and ii) activation of a second random set of the multiple phases during a second control cycle of the multiple cycles.

Clause 9. The multi-phase power supply circuit as in any of one or more clauses, wherein a number of phases activated in the first random set is different than a number of phases activated in the second random set.

Clause 10. The multi-phase power supply circuit as in any of one or more clauses, wherein a number of phases activated in the first random set is equal to a number of phases activated in the second random set.

Clause 11. The multi-phase power supply circuit as in any of one or more clauses, wherein the first random set of phases activated during the first control cycle includes a first phase of the multiple phases, the first phase absent from the second random set of phases activated during the second control cycle.

Clause 12. The multi-phase power supply circuit as in any of one or more clauses, wherein the control information includes a first control parameter specifying a polarity of an error voltage derived from comparing the output voltage to a reference voltage, the polarity indicating whether a set of multiple phases selected for a control cycle is to sink or source a respective quantum of energy.

Clause 13. The multi-phase power supply circuit as in any of one or more clauses, wherein the control information includes a second control parameter, a setting of which controls how many of the multiple phases are randomly chosen by the multiple phases to be activated to reduce the error voltage.

Clause 14. The multi-phase power supply circuit as in any of one or more clauses, wherein the control information includes first control information and second control information, the first control information operable to control random selection of a first set of the multiple phases for activation in a first control cycle of the multiple control cycles, the second control information operable to control random selection of a second set of the multiple phases for activation in a second control cycle of the multiple control cycles.

Clause 15. The multi-phase power supply circuit as in any of one or more clauses, wherein each of the multiple phases outputs a substantially same predetermined amount of energy when activated in a given control cycle.

Clause 16. The multi-phase power supply circuit as in any of one or more clauses, wherein the control circuitry is operable to initiate activation of a set of phases in a given control cycle of the multiple control cycles, phases in the set activated at different times in the given control cycle.

Clause 17. The multi-phase power supply circuit as in any of one or more clauses further comprising:

a random number generator, the random number generator operable to produce a respective different random number for each control cycle of the multiple control cycles; and wherein each phase of the multiple phases is assigned a corresponding unique identifier value; and wherein the control circuitry is operable to apply the respective random number to the corresponding unique identifier value to produce a respective personal random number value for a respective phase, the respective personal random number value for the respective phase compared to the control information to determine whether to activate the respective phase for a given control cycle.

Clause 18. The multi-phase power supply circuit as in any of one or more clauses, wherein each of the phases includes a DC to DC converter circuit to sink or source energy to regulate the output voltage, each of the multiple phases operable to output a substantially same amount energy when activated.

Clause 19. A method of controlling multiple phases to produce an output voltage to power a load, the method comprising:
monitoring the output voltage;
producing control information that supports randomized activation of the multiple phases over each of multiple control cycles, the control information generated based on the monitored magnitude of the outputoutput voltage; and
in accordance with the control information, selectively outputting a quantum of energy from each respective phase of the multiple phases to maintain regulation of the output voltage in accordance with the control information.

Clause 20. The method as in any of one or more clauses, wherein execution of the control information by each of the multiple phases results in: i) activation of a first random set of the multiple phases during a first control cycle of the multiple cycles, and ii) activation of a second random set of the multiple phases during a second control cycle of the multiple cycles.

Clause 21. The method as in any of one or more clauses, wherein a number of phases activated in the first random set is different than a number of phases activated in the second random set.

Clause 22. The method as in any of one or more clauses, wherein a number of phases activated in the first random set is equal to a number of phases activated in the second random set.

Clause 23. The method as in any of one or more clauses, wherein the first random set of phases activated during the first control cycle includes a first phase of the multiple phases, the first phase absent from the second random set of phases activated during the second control cycle.

Clause 24. The method as any of one or more clauses, wherein the control information includes a first control parameter specifying a polarity of an error voltage derived from comparing a magnitude of the output voltage to a reference voltage, the polarity indicating whether a set of multiple phases for a control is to sink or source current to the load.

Clause 25. The method as in any of one or more clauses, wherein the control information includes a second control parameter, a setting of which controls how many of the multiple phases are randomly chosen to be activated to reduce the error voltage.

Clause 26. The method as in any of one or more clauses, wherein the control information includes first control information and second control information, the first control information operable to control random activation of a first set of the multiple phases in a first control cycle of the multiple control cycles, the second control information operable to control random activation of a second set of the multiple phases in a second control cycle of the multiple control cycles.

Clause 27. The method as in any of one or more clauses, wherein each of the multiple phases outputs a substantially same predetermined amount of energy when activated in a given control cycle.

Clause 30. The method as in any of one or more clauses, wherein each of the phases includes a DC to DC converter circuit to sink or source energy to regulate the output voltage, each of the multiple phases operable to output a substantially same amount energy when activated.

Clause 31. Computer-readable storage media having instructions stored thereon to control an output voltage of a multi-phase power supply circuit, such that the instructions, when carried out by computer processor hardware, cause the computer processor hardware to:
monitor the output voltage;
produce control information that supports randomized activation of the multiple phases over each of multiple control cycles, the control information generated based on the monitored magnitude of the output voltage; and
in accordance with the control information, selectively output a quantum of energy from each respective phase of the multiple phases to maintain regulation of the output voltage in accordance with the control information.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A multi-phase power supply circuit comprising:
multiple phases that collectively operate to produce an output voltage to power a load;
a controller operable to monitor the output voltage and produce control information to control the multiple phases, the control information generated based on the monitored output voltage, the control information communicated to each of the multiple phases to control randomized activation of the multiple phases; and
each respective phase of the multiple phases operable to receive and process the control information to determine, independently with respect to other phases, whether to output current to maintain regulation of the output voltage;
wherein the control information communicated to each of the multiple phases includes a probability value and a polarity value based on an error voltage determined from comparing the output voltage to a reference voltage;
wherein the probability value indicates a probability in which to selectively activate each of the respective phases, the controller operable to generate the probability value based on the monitored output voltage; and
wherein the polarity value indicates whether to sink or source current to the load.

2. The multi-phase power supply circuit as in claim 1, wherein a magnitude of the probability value varies depending on a magnitude of the error voltage, the magnitude of the probability value being proportional to a relative number of phases to activate to reduce the error voltage.

3. The multi-phase power supply circuit as in claim 2 further comprising:
a random number generator, the random number generator operable to produce a respective random number for each control cycle of multiple control cycles; and
wherein each phase of the multiple phases is assigned a corresponding static unique identifier value, each respective phase of the multiple phases operable to apply the respective random number to the corresponding static unique identifier value to produce a respective unique personal random number value for the respective phase for a given control cycle, the respective phase using the respective unique personal random number value assigned to the respective phase and the control information to determine whether to activate the phase during the control cycle.

4. The multi-phase power supply circuit as in claim 2, wherein a number of phases to be activated for a given control cycle is determined based on a setting of the probability value and a distribution of personal random numbers assigned to the phases.

5. The multi-phase power supply circuit as in claim 4, wherein each of the phases activated during the given control cycle is operable to output a substantially same predetermined amount of energy for the given control cycle to maintain the output voltage.

6. The multi-phase power supply circuit as in claim 1, wherein the control information supports randomized activation of the multiple phases over each of multiple control cycles depending on random number data received by each of the multiple phases.

7. The multi-phase power supply circuit as in claim 1, wherein a magnitude of the probability value is proportional to how many of the multiple phases are to be activated for a given control cycle.

8. The multi-phase power supply circuit as in claim 1, wherein a magnitude of the probability value is a non-zero value.

9. The multi-phase power supply circuit as in claim 8, wherein the multiple phases include a first phase and a second phase; and wherein a setting of the magnitude of the probability value to the non-zero value results in activation of the first phase and non-activation of the second phase for a given control cycle to which the non-zero value pertains.

10. The multi-phase power supply circuit as in claim 8, wherein the multiple phases include a first phase and a second phase;
wherein the first phase is operative to activate itself in response to the non-zero value; and
wherein the second phase is operative to deactivate itself in response to the non-zero value.

11. The multi-phase power supply circuit as in claim 8, wherein a setting of the probability value varies over each of multiple control cycles of controlling the multiple phases between 0% probability and 100% probability.

12. The multi-phase power supply circuit as in claim 1, wherein a magnitude of the probability value represents a percentage of the multiple phases desired to be activated for a given control cycle.

13. A multi-phase power supply circuit comprising: multiple phases that collectively operate to produce an output voltage to power a load; control circuitry operable to: i) monitor the output voltage and produce control information, and ii) communicate the control information to each of the multiple phases, the control information randomizing activation of the multiple phases over each of multiple control cycles, the control information generated based on the monitored output voltage; and each respective phase of the multiple phases operable to receive the control information and selectively supply current to the load to maintain regulation of the output voltage in accordance with the control information, wherein the control information communicated to each of the multiple phases includes a probability value and a polarity value based on an error voltage determined from comparing the output voltage to a reference voltage; wherein the probability value indicates a probability in which to selectively activate each of the respective phases, the control circuitry operable to generate the probability value based on the monitored output voltage; and wherein the polarity value indicates whether to sink or source current to the load.

14. The multi-phase power supply circuit as in claim 13, wherein execution of the control information by each of the multiple phases results in: i) activation of a first random set of the multiple phases during a first control cycle of the multiple cycles, and ii) activation of a second random set of the multiple phases during a second control cycle of the multiple cycles.

15. The multi-phase power supply circuit as in claim 14, wherein a number of phases activated in the first random set is different than a number of phases activated in the second random set.

16. The multi-phase power supply circuit as in claim 14, wherein a number of phases activated in the first random set is equal to a number of phases activated in the second random set.

17. The multi-phase power supply circuit as in claim 14, wherein the first random set of phases activated during the first control cycle includes a first phase of the multiple phases, the first phase absent from the second random set of phases activated during the second control cycle.

18. The multi-phase power supply circuit as in claim 13, wherein the control information includes first control information and second control information, the first control information operable to control random selection of a first set of the multiple phases for activation in a first control cycle of the multiple control cycles, the second control information operable to control random selection of a second set of the multiple phases for activation in a second control cycle of the multiple control cycles.

19. The multi-phase power supply circuit as in claim 13, wherein each of the multiple phases outputs a substantially same predetermined amount of energy when activated in a given control cycle.

20. The multi-phase power supply circuit as in claim 13, wherein the control circuitry is operable to initiate activation of a set of phases in a given control cycle of the multiple control cycles, phases in the set activated at different times in the given control cycle.

21. The multi-phase power supply circuit as in claim 13 further comprising: a random number generator, the random number generator operable to produce a respective different random number for each control cycle of the multiple control cycles; and wherein each phase of the multiple phases is assigned a corresponding unique identifier value; and wherein each respective phase of the multiple phases is operable to apply the respective random number to the corresponding unique identifier value to produce a respective personal random number value for a respective phase, the respective personal random number value for the respective phase compared to the control information to determine whether to activate the respective phase for a given control cycle.

22. The multi-phase power supply circuit as in claim 13, wherein each of the multiple phases includes a DC to DC converter circuit to sink or source energy to regulate the output voltage, each of the multiple phases operable to output a substantially same amount energy when activated.

23. The multi-phase power supply circuit as in claim 13, wherein a setting of the probability value over each of multiple control cycles of controlling the multiple phases varies between 0% and 100%.

24. A method of controlling multiple phases to produce an output voltage to power a load, the method comprising: monitoring the output voltage; producing control information; communicating the control information to each of the multiple phases, the control information used by each of the multiple phases to control random activation of the multiple phases over each of multiple control cycles, the control information generated based on the monitored output voltage; in accordance with the control information, selectively outputting a quantum of energy from each respective phase of the multiple phases to maintain regulation of the output voltage in accordance with the control information; wherein the control information communicated to each of the multiple phases includes a probability value and a polarity value based on an error voltage determined from comparing the output voltage to a reference voltage; wherein the probability value indicates a probability in which to selectively activate each of the respective phases, a controller operable to generate the probability value based on the monitored output voltage; and wherein the polarity value indicates whether to sink or source current to the load.

25. The method as in claim 24, wherein execution of the control information by each of the multiple phases results in: i) activation of a first random set of the multiple phases during a first control cycle of the multiple control cycles, and ii) activation of a second random set of the multiple phases during a second control cycle of the multiple control cycles.

26. The method as in claim 25, wherein a number of phases activated in the first random set is different than a number of phases activated in the second random set.

27. The method as in claim 25, wherein a number of phases activated in the first random set is equal to a number of phases activated in the second random set.

28. The method as in claim 25, wherein the first random set of phases activated during the first control cycle includes a first phase of the multiple phases, the first phase absent from the second random set of phases activated during the second control cycle.

29. The method as in claim 24, wherein the control information includes first control information and second control information, the first control information operable to control random activation of a first set of the multiple phases in a first control cycle of the multiple control cycles, the second control information operable to control random activation of a second set of the multiple phases in a second control cycle of the multiple control cycles.

30. The method as in claim 29, wherein each of the multiple phases outputs a substantially same predetermined amount of energy when activated in a given control cycle.

31. The method as in claim 24, wherein each of the phases includes a DC to DC converter circuit to sink or source energy to regulate the output voltage, each of the multiple phases operable to output a substantially same amount of energy when activated.

32. The method as in claim 24, wherein a setting of the probability value varies between 0% and 100% over each of multiple control cycles of controlling the multiple phases.

33. Computer-readable storage hardware having instructions stored thereon to control an output voltage of a multi-phase power supply circuit, such that the instructions, when carried out by computer processor hardware, cause the computer processor hardware to: monitor the output voltage; produce control information that supports randomized activation of the multiple phases over each of multiple control cycles, the control information generated based on the monitored output voltage; and in accordance with the control information, selectively output a quantum of energy from each respective phase of the multiple phases to maintain regulation of the output voltage in accordance with the control information; wherein the control information communicated to each of the multiple phases includes a probability value and a polarity value based on an error voltage determined from comparing the output voltage to a reference voltage; wherein the probability value indicates a probability in which to selectively activate each of the respective phases, a controller operable to generate the probability value based on the monitored output voltage; and wherein the polarity value indicates whether to sink or source current to the load.

\* \* \* \* \*